US007250118B2

(12) United States Patent
Brady et al.

(10) Patent No.: US 7,250,118 B2
(45) Date of Patent: Jul. 31, 2007

(54) AGGLOMERATED NANOPARTICLES HAVING A RUTILE-LIKE CRYSTALLINE PHASE

(75) Inventors: John T. Brady, White Bear Township, MN (US); David S. Arney, St. Paul, MN (US); Robert W. Ferguson, St. Paul, MN (US); James A. Higgins, River Falls, WI (US); Charles J. Studiner, IV, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 143 days.

(21) Appl. No.: 10/915,308

(22) Filed: Aug. 10, 2004

(65) Prior Publication Data

US 2005/0063897 A1    Mar. 24, 2005

Related U.S. Application Data

(62) Division of application No. 09/990,604, filed on Nov. 21, 2001, now Pat. No. 6,962,946.

(51) Int. Cl.
*B01F 3/20* (2006.01)
*C09D 7/12* (2006.01)
*C01G 30/00* (2006.01)
*C08K 3/22* (2006.01)

(52) U.S. Cl. ................ 252/363.5; 516/33; 516/36; 516/90; 428/403

(58) Field of Classification Search ............... 423/598; 516/90, 91, 33, 36; 106/287.19, 286.4; 252/363.5; 428/403
See application file for complete search history.

(56) References Cited

U.S. PATENT DOCUMENTS

| | | | |
|---|---|---|---|
| 2,220,966 A | 11/1940 | Krchma | 106/436 |
| 2,504,424 A | 8/1950 | Kraak | 138/30 |
| 3,676,362 A | 7/1972 | Yates | 516/33 |
| 4,224,080 A | 9/1980 | Chambers et al. | 106/439 |
| 4,239,548 A | 12/1980 | Barnard et al. | 106/439 |
| 4,576,921 A | 3/1986 | Lane | 501/12 |
| 4,612,138 A | 9/1986 | Keiser | 516/88 |
| 4,770,777 A | 9/1988 | Steadly et al. | 210/490 |
| 4,968,498 A | 11/1990 | Wautier et al. | 423/593.1 |
| 5,037,579 A | 8/1991 | Matchett | 516/90 |
| 5,049,309 A | 9/1991 | Sakamoto et al. | 516/90 |
| 5,104,929 A | 4/1992 | Bilkadi | 524/847 |
| 5,391,210 A | 2/1995 | Bilkadi et al. | 51/298 |
| 5,403,513 A | 4/1995 | Sato et al. | 516/90 |
| 5,451,252 A | 9/1995 | Elfenthal et al. | 106/436 |
| 5,644,007 A | 7/1997 | Davidson et al. | 526/64 |
| 5,652,192 A | 7/1997 | Matson et al. | 502/304 |
| 5,714,260 A | 2/1998 | Okuda et al. | 428/402 |
| 5,759,256 A | 6/1998 | Stramel | 106/439 |
| 5,776,239 A | 7/1998 | Bruno | 106/437 |
| 5,814,278 A | 9/1998 | Maistrovich et al. | 422/109 |
| 5,816,291 A | 10/1998 | Johannesson | |
| 5,873,931 A | 2/1999 | Scholz et al. | 106/287.1 |
| 5,997,621 A | 12/1999 | Scholz et al. | 106/13 |
| 6,072,070 A | 6/2000 | Albonetti et al. | 558/319 |
| 6,189,340 B1 | 2/2001 | Burke et al. | 65/399 |
| 6,261,700 B1 | 7/2001 | Olson et al. | 428/522 |
| 6,328,947 B1 | 12/2001 | Monden et al. | 423/611 |
| 6,448,353 B1 | 9/2002 | Nelson et al. | 526/265 |
| 2002/0073895 A1 | 6/2002 | Barnes et al. | 106/451 |
| 2003/0165680 A1 | 9/2003 | Brady et al. | 428/402 |
| 2005/0065222 A1 | 3/2005 | Brady et al. | |

FOREIGN PATENT DOCUMENTS

| | | |
|---|---|---|
| JP | 6-329988 | 11/1994 |
| WO | WO 95/13251 | 5/1995 |
| WO | WO 00/06495 | 2/2000 |
| WO | WO 00/44830 | 8/2000 |
| WO | WO 00/58962 | 10/2000 |

OTHER PUBLICATIONS

JPO on East, Nov. 29, 1994, Japan Patent Office, JP406329988A, (Nikon Corp), abstract.*
Machine translation of JP 06-329988 A, Japan Patent Office, http://www6.ipdl.jpo.go.jp/Tokujitu/PAJdetail.ipdl?N0000=80&N0120=01&N2001=2&N3001=H06-329988.*
Berry et al, An investigation of the titanium-antimony-oxygen system by x-ray diffraction, antimony-121 Moessbauer spectroscopy, and temperature-programmed reduction, Journal of the Chemical Society, Dalton Transactions: Inorganic Chemistry, (1988), (8), 2161-2166.*
Ha et al., "Anatase-Rutile Transition of Precipitated Titanium Oxide with Alcohol Rinsing", Journal of Colloid and Interface Science (2000), vol. 223, pp. 16-20, month unknown.
"The production of man-made fibers: A challenge", Sachtleben Publications, Web Page: http://www.sachtleben.de/h/e/pub/1020e.phtml (presumed posted: Mar. 1999—downloaded .pdf file).
Eppler et al., "Effect of Antimony Oxide on the Anatase-Rutile Transformation in Titanium Dioxide", Journal of American Ceramic Society (1987), vol. 70(4), pp. C-64-C-66, month unknown.
Yin et al., "Hydrothermal synthesis of nanosized anatase and rutile $TiO_2$ using amorphous phase $TiO_2$", Journal of Materials Chemistry (2001), vol. 11, pp. 1694-1703, month unknown.
Ocana et al., "Low-Temperature Nucleation of Rutile Observed by Raman Spectroscopy during Crystallization of $TiO_2$", Journal of American Ceramic Society (1992), vol. 75(7), pp. 2010-2012, month unknown.
Aruna et al., "Nanosize rutile titania particle synthesis via a hydrothermal method without mineralizers",. Journal of Materials Chemistry (2000), vol. 10, pp. 2388-2391, month unknown.

(Continued)

*Primary Examiner*—Daniel S. Metzmaier
(74) *Attorney, Agent, or Firm*—Bradford B. Wright

(57) ABSTRACT

Agglomerated nanoparticles including Ti/Sb mixed oxide nanoparticles having a rutile-like crystalline phase content of at least 20 weight percent, wherein the nanoparticles have at least one organic moiety bound to the nanoparticle surface, and wherein the weight ratio of antimony to titanium in the Ti/Sb mixed oxide nanoparticles is in a range of from at least 0.42 up to and including 2.93. The agglomerated nanoparticles are redispersible into a liquid vehicle.

8 Claims, 1 Drawing Sheet

OTHER PUBLICATIONS

Rentschler et al., "Optimum particle size is essential", Web Page: http://www2.coatings.de/ARTICLE.HTM (presumed posted on Mar. 19, 1999, originally published in European Coatings Journal, Apr. 1999).

Ozawa et al., "Preparation of Polycrystalline Antimonic Acid Films by Electrophoretic Deposition", Journal of Sol-Gel Science and Technology (2000), vol. 19, pp. 595-598, month unknown.

Bacsa et al., "Rutile Formation in Hydrothermally Crystallized Nanosized Titania", Journal of American Ceramic Society (1996), vol. 79 [8], pp. 2185-2188, month unknown.

Wang et al., "Sol-Gel Synthesis and Hydrothermal Processing of Analase and Rutile Titania Nanocrystals", Chem. Mater. (1999), vol. 11, pp. 3113-3120, month unknown.

Gol'dshtein et al., "Structure of Solid Solutions in the System $TiO_2$-$Sb_2O_3$, and the Influence of Sodium, Present as Impurity, On Its Phase Formation", Translated from Izvestiya Akademii Nauk SSSR, Neorganicheskie Materialy, vol. 10, No. 1, pp. 176-178, Jan. 1974 (Original article submitted Mar. 2, 1972).

Ramos et al., "Synthesis, Structural Characterization and Properties of Solid Solutions Ti-Cu-Sb-O With Rutile Structure,", Materials Research Bulletin (1992), vol. 27, pp. 1431-1438, month unknown.

Vasilescu et al., "Sol-gel materials in TiO2-Sb2O3 system", Advances in Science and Technology (Faenza, Italy)(1995), 3B (Ceramics:Charting the Future), pp. 717-724, month unknown.

\* cited by examiner

AGGLOMERATED NANOPARTICLES HAVING A RUTILE-LIKE CRYSTALLINE PHASE

CROSS-REFERENCE TO RELATED APPLICATION

This application is a divisional of U.S. patent application Ser. No. 09/990,604, filed Nov. 21, 2001, and issued as U.S. Pat. No. 6,962,946 on Nov. 8, 2005, the disclosure of which is herein incorporated by reference.

FIELD OF THE INVENTION

This invention relates to nanometer-sized particles comprising oxides of titanium and antimony, and in particular, to methods of making such particles, and compositions and articles containing same.

BACKGROUND OF THE INVENTION

Nanocomposite materials, that is, materials having homogenously dispersed inorganic nanoparticles in an organic binder, have been used as protective transparent coatings for various applications. Such materials may have improved abrasion resistance and/or optical properties (e.g., refractive index) as compared to coatings of the corresponding organic binder not having inorganic nanoparticles dispersed therein.

Nanocomposite materials containing various inorganic nanoparticles, such as titania (i.e., titanium dioxide) nanoparticles, have been described. Titania occurs in at least three crystal forms: anatase, brookite, and rutile. Of these, the rutile form has the greatest density, hardness, and refractive index.

Major problems with preparing titanium oxide sols, and particularly titanium oxide sols having the rutile crystalline phase may include: long process times, the need to use additional stabilizing counterions (e.g., chloride, nitrate, etc.) that must be laboriously removed prior to use in applications such as organic protective films, extreme pH values, and/or limited stability.

It would be desirable to have quick and easy methods for preparing stable colloidal dispersions of inorganic particles containing titanium, wherein the particles have properties at least comparable to the rutile form of titania. It would also be desirable to homogeneously incorporate such particles into an organic binder to provide high index of refraction abrasion resistant coatings.

SUMMARY OF THE INVENTION

In one aspect, the invention provides a composition comprising a plurality of Ti/Sb mixed oxide nanoparticles in the form of an aqueous colloidal dispersion, wherein the Ti/Sb mixed oxide nanoparticles comprise a rutile-like crystalline phase.

In some embodiments the nanoparticles have at least one organic moiety bound to the nanoparticle surface.

In another aspect, the invention provides a method for preparing an aqueous colloidal dispersion of Ti/Sb mixed oxide nanoparticles comprising the steps of:

a) providing an aqueous titania precursor;
b) providing an aqueous antimony oxide precursor;
c) combining with mixing both aqueous precursors; and
d) hydrothermally processing the mixture;

wherein the weight ratio of titanium to antimony is in the range of from about 0.14 to about 11.3.

In some embodiments, the method further comprises the step of modifying the surface of the nanoparticles.

Colloidal dispersions prepared according to the invention typically are highly stable.

In another aspect, the invention provides a composition comprising agglomerated nanoparticles, wherein the agglomerated nanoparticles comprise Ti/Sb mixed oxide nanoparticles comprising a rutile-like crystalline phase.

In some embodiments, the agglomerated nanoparticles are redispersible into a liquid vehicle.

In another aspect, the invention provides a nanocomposite precursor comprising a plurality of nanoparticles homogeneously dispersed in an organic binder precursor, wherein the nanoparticles comprise Ti/Sb mixed oxide nanoparticles containing a rutile-like crystalline phase.

In another aspect, the invention provides a nanocomposite comprising a plurality of nanoparticles dispersed in an organic binder, wherein the nanoparticles comprise Ti/Sb mixed oxide nanoparticles containing a rutile-like crystalline phase.

In some embodiments, the nanoparticles have at least one organic moiety bound to the nanoparticle surface.

In some embodiments, nanocomposites according to the invention may be supported on a substrate.

Nanocomposites according to the invention are well suited for use as protective coatings, and may have a high refractive index.

As used herein, the following definitions apply:

"aqueous titania precursor" refers to an aqueous titanium containing composition that may be converted to titania by one or more of heating, evaporation, precipitation, pH adjustment, and combinations thereof;

"aqueous antimony oxide precursor" refers to an aqueous antimony containing composition that may be converted to antimony oxide by one or more of heating, evaporation, precipitation, pH adjustment, and combinations thereof;

"hydrothermal processing" means heating in aqueous media, in a closed vessel, to a temperature above the normal boiling point of water;

"nanoparticle" means a particle having a maximum particle diameter of less than 500 nanometers;

"rutile-like" means having a tetragonal crystal structure and a space group of $P4_2/mnm$ (#136);

"organic moiety" means an organic group, ion, or molecule; and

"mixed oxide" means an intimate mixture of titanium and antimony oxides.

DETAILED DESCRIPTION OF THE INVENTION

Figure 1:
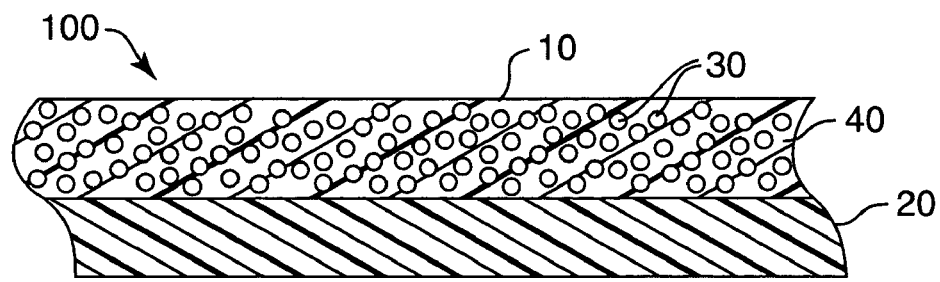
FIG. 1 is a cross-sectional view of a composite article according to the invention.

In its various aspects, the invention concerns nanoparticles comprising a mixed oxide of titanium and antimony (hereinafter abbreviated Ti/Sb mixed oxide), wherein at least a portion of the Ti/Sb mixed oxide has a rutile-like crystalline phase.

Nanoparticles

Nanoparticles of the invention comprise Ti/Sb mixed oxide. Typically, the weight ratio of antimony to titanium in the nanoparticles is in the range of about 0.14 to about 11.30, desirably in the range of from about 0.22 to about 5.02, and more desirably in the range of from about 0.42 to about 2.93.

Ti/Sb mixed oxide nanoparticles according to the invention desirably comprise a rutile-like crystalline phase. The rutile-like crystalline phase may co-exist with other crystalline phases within individual Ti/Sb mixed oxide nanoparticles. Individual nanoparticles may comprise up to 100 weight percent of the rutile-like crystalline phase. Ensembles of Ti/Sb mixed oxide nanoparticles (i.e., all Ti/Sb mixed oxide nanoparticles taken as a whole) will typically comprise nanoparticles having a variety of sizes, elemental compositions, and crystalline phases. The term "ensemble average" of a parameter, as used herein, refers to the average value of that parameter across the entire ensemble being referred to. Thus, the term refers to a property of the bulk, not necessarily reflective of that property in each individual member of the ensemble.

Desirably, the ensemble average rutile-like crystalline phase content of Ti/Sb mixed oxide nanoparticles is at least about 20 weight percent, more desirably at least about 40 weight percent, more desirably at least about 60 weight percent, and even more desirably at least about 80 weight percent based on the total weight of Ti/Sb.

In some applications, it may be desirable that substantially all of the Ti/Sb mixed oxide nanoparticles contain a rutile-like crystalline phase.

Desirably, as measured by X-Ray Diffraction analysis (i.e., XRD, as described hereinbelow), the ensemble average relative intensity of rutile-like crystalline phase as compared to anatase, for Ti/Sb mixed oxide nanoparticles of the invention, is greater than about 1:10. Further, it may also be desirable that the relative intensity of any anatase or antimony oxide maxima observed by XRD have a relative intensity of less that 1 percent, more desirably less than 0.1 percent, where the relative intensity of the greatest diffraction maximum of the rutile-like phase is defined to be 100 percent.

Typically, the Ti/Sb mixed oxide nanoparticles are free of additional metallic elements, although for some particular applications it may be desirable to add additional elements (including silicon). If additional metallic elements are present, they are desirably in an amount of less than about 0.1 moles per mole of titanium present in the ensemble average of Ti/Sb mixed oxide nanoparticles. Exemplary additional metallic elements include the rare earth elements.

Ti/Sb mixed oxide nanoparticles of the invention typically have an ensemble average particle size of less than about 500 nanometers, more desirably less than about 100 nanometers, and still more desirably less than about 40 nanometers, especially when the nanoparticles are to be incorporated into a transparent coating.

In some embodiments, Ti/Sb mixed oxide nanoparticles may be combined with additional nanoparticles having a different elemental composition (e.g., silica, zirconia, alumina, titania, antimony pentoxide). Desirably, such additional nanoparticles, if present, have an average particle size comparable to that of the Ti/Sb mixed oxide nanoparticles. Such nanoparticles may be commercially obtained, for example, from Nalco Chemical Co. (Naperville, Ill.) or Nyacol Nano Technologies, Inc. (Ashland, Mass.). Exemplary additional nanoparticles are also described in U.S. Pat. Nos. 5,037,579; 6,261,700; and 6,261,700; which disclosures are incorporated herein by reference.

In some embodiments of the invention, the nanoparticles are selected such that colloids and nanocomposites are free from a degree of particle agglomeration or coagulation that would interfere with the desired properties of the composition. Desirably, individual, unassociated (i.e., non-agglomerated and non-coagulated) particles are dispersed throughout the composition. In these embodiments, the particles desirably do not irreversibly associate (for example, by covalently bonding and/or hydrogen bonding) with each other.

In other embodiments, such as in the preparation of thin films, it may be desirable for the nanoparticles to irreversibly agglomerate, especially when employed without a dispersing medium (e.g., liquid vehicle or binder).

Nanoparticles may be present in colloidal dispersions of the invention in an amount of up to 30 percent, or more. The amount may vary with density and surface characteristics of the nanoparticle. Desirably, nanoparticles are present in an amount of from about 1 to about 25 weight percent, more desirably from about 10 to about 20 weight percent, of the colloidal dispersion.

Depending on the application, the pH of colloidal dispersions of the invention may be any value, but typically range from about 4 to about 9, desirably from about 5 to about 8.

Colloidal dispersions of the invention are typically prepared as a dispersion of nanoparticles in an aqueous vehicle. The aqueous vehicle comprises water, typically as the predominant ingredient, and may contain organic solvents (especially solvents that may be present in the titania or antimony oxide precursors). Solvent may be added prior to, or more desirably following, hydrothermal processing. Exemplary organic solvents include alcohols, ethers, and/or ketones having from 4 to 12 carbon atoms. One such desirable solvent is 1-methoxy-2-propanol.

Solvents used in the present invention, if present, are chosen based on volatility and compatibility with the aqueous titania and antimony oxide precursors, binder precursor, and/or binder, depending on the point at which they may be added.

Nanocomposites

Nanoparticles according to the invention may be incorporated in a binder to form a nanocomposite. The nanoparticles may be either directly incorporated into the binder, or incorporated into a binder precursor that is subsequently cured to form a binder. Desirably, nanoparticles are present in the nanocomposite in an amount of at least 30 weight percent based on the total weight of the nanocomposite.

Compatibility of inorganic nanoparticles with organic binders is typically achieved by appropriate treatment of the inorganic particles with a coupling agent.

Prior to incorporation into either a binder or binder precursor, nanoparticles employed in practice of the present invention are typically surface-modified, which may be achieved by attaching surface-modifying agent(s) to the particle surface. Surface-modifying agent(s) attached to the surface of the particle can modify the surface characteristics of the particles to achieve a variety of properties including, for example, to increase the compatibility of the particles with the components of the composition, to facilitate dispersion of the particles in the composition (either from isolated or colloidal form), and to enhance optical clarity of the composition and combinations thereof. The particles can also be surface-modified to include surface groups capable of associating with other components of the composition. When the composition is polymerized, for example, the surface groups can associate with at least one component of the composition to become part of the polymer network. Preferably, the surface groups are capable of associating with the first monomer, the second monomer, or a combination thereof. Preferably, the particles are surface-modified to include a combination of surface groups capable of providing compositions having desired dispersion, clarity, adhesive, and rheological properties.

Schematically, surface-modifying agents can be represented by the formula A-B where the A group is capable of attaching to the surface of the particle, and where the B group is a compatibilizing group that may be reactive or non-reactive with the components of the composition. Compatibilizing groups B that impart polar character to the particles include, for example, polyethers. Compatibilizing groups B that impart non-polar character to the particles include, for example, hydrocarbons.

Exemplary suitable surface-modifying agents include, for example, carboxylic acids, sulfonic acids, phosphonic acids, silanes, phosphates, and combinations thereof. Useful carboxylic acids include, for example, long chain aliphatic acids including octanoic acid, oleic acid, and combinations thereof. Representative examples of polar modifying agents having carboxylic acid functionality include $CH_3O(CH_2CH_2O)_2CH_2CO_2H$, 2-(2-methoxyethoxy)acetic acid, and mono(polyethylene glycol) succinate. Representative examples of nonpolar surface-modifying agents having carboxylic acid functionality include octanoic acid, dodecanoic acid, and oleic acid.

Exemplary useful silanes include organosilanes, for example, octyltrimethoxysilane, 3-methacryloyloxypropyltrimethoxysilane, 3-mercaptopropyltrimethoxysilane, n-octyltriethoxysilane, phenyltriethoxysilane, p-tolyltriethoxysilane, vinyltrimethoxysilane, and combinations thereof.

Exemplary useful non-silane surface-modifying agents capable of associating with organic components of the composition include acrylic acid, methacrylic acid, beta-carboxyethyl acrylate, mono-2-(methacryloxyethyl) succinate, and combinations thereof. A useful surface-modifying agent that imparts both polar character and reactivity to the particles is mono-(methacryloxypolyethyleneglycol) succinate.

Nanoparticles can be surface modified using a variety of methods including, e.g., adding a surface-modifying agent to nanoparticles (e.g., in the form of a powder or an aqueous sol) and allowing the surface-modifying agent to react with the nanoparticles. A co-solvent can be added to the composition to increase the compatibility (e.g., solubility or miscibility) of the surface-modifying agent and/or surface modified particles with the aqueous mixture.

The surface-modified nanoparticles may be intimately mixed with a curable binder precursor that may be subsequently processed prior to curing. The choice of binder precursor is not critical so long as it is not reactive under ambient conditions with the surface-modified nanoparticles. Exemplary binder precursors include, but are not limited to, polymerizable materials such as free-radically polymerizable monomers and oligomers such as acrylates, methacrylates, allylic compounds, vinyl ethers, vinyl esters, and the like; epoxy resins; alkyd resins; phenolic resins; cyanate esters; melamine and melamine-formaldehyde resins; polyurethane resins, and mixtures thereof. Desirably, binder precursors comprise acrylates and/or methacrylates.

The binder precursor may include a catalyst or other curative in order to facilitate cure. Such catalysts and other curatives will depend on the nature of the binder precursor and may include those well known in the curing art, for example, thermal free radical initiators, such as peroxides and azo compounds, photoinitiators, photocatalysts, amine hardeners, mercaptans, etc.

The binder precursor may be cured to form a binder by application of energy such as heat or actinic radiation (e.g., ultraviolet light and electron beam radiation), or through addition of a catalyst or curative. Desirably, in the case of free-radically polymerizable binder precursors, a photoinitiator is present in the binder precursor and the mixture is irradiated with ultraviolet actinic radiation from a lamp, desirably in an inert atmosphere such as nitrogen. The use of actinic radiation to cure the binder precursor allows a high degree of flexibility in the choice of protecting groups.

When used, the amount of actinic radiation energy used for curing depends upon a number of factors, such as the amount and the type of reactants involved, the energy source, web speed, the distance from the energy source, and the thickness of the material to be cured. As general guidelines, actinic radiation typically involves a total energy exposure from about 0.1 to about 10 Joules per square centimeter, and electron beam radiation typically involves a total energy exposure in the range from less than 1 megarad to 100 megarads or more, desirably 1 to 10 megarads. Exposure times may be from less than about 1 second up to 10 minutes or more.

Commercially available free-radical generating photoinitiators suitable for the invention include, but are not limited to, benzophenone, benzoin ether, and acylphosphine photoinitiators such as those sold under the trade designations IRGACURE and DAROCUR from Ciba-Geigy Corp. (Ardsley, N.Y.). The amount of photoinitiator(s) used typically varies between 0.1 and 15 weight percent, desirably between 0.5 and 7 weight percent, based on the total weight of the binder precursor.

Co-initiators and amine synergists can be included in order to improve curing rate. Examples of such include isopropylthioxanthone, ethyl 4-(dimethylamino)benzoate, 2-ethylhexyl dimethylaminobenzoate, and dimethylaminoethyl methacrylate.

The volume ratio of surface-modified nanoparticles to binder precursor may range from 1:99 up to 70:30, desirably from 5:95 up to 55:45, and more desirably from 10:90 up to 40:60.

For applications in which transparency is important, nanoparticles present in the binder precursor and/or binder desirably have a small particle size (e.g., <40 nm) to minimize the effects of light scattering.

Those skilled in the art will also appreciate that, depending on the application, the binder and its precursor can contain other optional adjuvants, such as surfactants, antistatic agents (e.g., conductive polymers), leveling agents, thermal initiators, photosensitizers, UV absorbers, stabilizers, antioxidants, fillers, lubricants, pigments, dyes, plasticizers, suspending agents, and the like.

Articles

As illustrated in FIG. 1, a composite article 100 may comprise a nanocomposite layer 10 containing Ti/Sb mixed oxide nanoparticles 30 dispersed in a binder 40, and supported on a substrate 20, wherein at least a portion of the Ti/Sb mixed oxide nanoparticles contain a rutile-like crystalline phase.

The substrate may be virtually any solid material. Non-limiting examples of such substrates include glass (including electronic displays), quartz, transparent or translucent ceramics, wood, metal, painted surfaces including painted metals, and thermoset and thermoplastic materials such as acrylic polymers (e.g., polymethyl methacrylate), polycarbonates, polyurethanes, polystyrene, styrene copolymers, such as acrylonitrile-butadiene-styrene copolymer and acrylonitrile-styrene copolymer, cellulose esters (e.g., cellulose acetate, cellulose diacetate, cellulose triacetate, and cellulose acetate-butyrate copolymer), polyvinyl chloride, polyolefins (e.g., polyethylene and polypropylene), polyamides, polyimides, phenolic resins, epoxy resins, polyphenylene oxide, and polyesters (e.g., polyethylene terephthalate). Thermoplastic materials may contain fillers and other adjuvants.

Desirably the substrate is glass or a thermoplastic polymer film. Substrates may be either opaque or transparent depending on the application.

Nanocomposite layer 10 may be prepared by coating a composition comprising nanoparticles 30 and a binder precursor onto substrate 20, and curing the binder precursor. Coating may be accomplished by virtually any known coating means that does not chemically or physically alter properties of the binder precursor. Exemplary coating methods include, for example, spin coating, knife coating, wire coating, flood coating, padding, spraying, exhaustion, dipping, roll coating, foam techniques, and the like.

The thickness of the mixture of binder precursor and nanoparticle layer that is applied will depend on the particular primary substrate and application. For protective coatings, the thickness of the resultant cured nanocomposite layer is desirably in the range of from about 1 nanometers up to about 50 micrometers or even thicker, more desirably from about from about 0.5 micrometers to about 10 micrometers, and more desirably from about from about 3 micrometers to about 6 micrometers. Thicker nanocomposite layers may lead to crazing and other defects over time; however, thinner layers often do not provide enough surface material to be scratch resistant.

When present as a coating on transparent or translucent substrates, the ingredients in the nanocomposite layer are desirably chosen so that it has a refractive index close to that of the substrate. This can help reduce the likelihood of Moire patterns or other visible interference fringes.

Method of Making Ti/Sb Mixed Oxide Nanoparticles and Colloids

Ti/Sb mixed oxide nanoparticles are prepared by combining an aqueous titania precursor with an aqueous antimony oxide precursor.

As intimate mixing of titanium and antimony atoms in the crystal lattice is highly desirable, aqueous antimony oxide precursors are desirably molecular species (i.e., species having a single antimony atom) or loosely associated species that dissociate under reaction conditions. Any titania or antimony oxide precursors meeting this requirement may be used.

Exemplary aqueous titania precursors include the reaction products of hydrogen peroxide with titanium alkoxides. Exemplary alkoxides include as 1-butoxide, 2-ethylhexoxide, 2-methoxy-1-ethoxide, linear and branched alkoxides (such as ethoxide, 1-propoxide, 2-propoxide, 2-butoxide, iso-butoxide, tert-butoxide, hexoxide, and the like). Two or more of the same or different organic ligands may be attached to the titanium. Desirably, the aqueous titania precursor is a reaction product of a titanium alkoxide with hydrogen peroxide.

Exemplary aqueous antimony oxide precursors include the reaction products of antimony alkoxides with hydrogen peroxide and $HSb(OH)_6$. Exemplary alkoxides include 1-butoxide, 2-ethylhexoxide, 2-methoxy-1-ethoxide, linear and branched alkoxides (such as ethoxide, 1-propoxide, 2-propoxide, 2-butoxide, isobutoxide, tert-butoxide, hexoxide, and the like). Two or more of the same or different organic ligands may be attached to the antimony.

The aqueous titania and antimony oxide precursors are combined with mixing and simultaneously, or sequentially, are subjected to conditions whereby they form a mixed oxide. The amount of each precursor employed is determined based on the stoichiometric quantity required to prepare Ti/Sb mixed oxide nanoparticles of the invention as described above. Additionally, aqueous metallic oxide precursors may be mixed with the aqueous titania and antimony oxide precursors, if desired.

After mixing the aqueous titania and antimony oxide precursors, the mixture is typically subjected to heat and pressure. In some embodiments, this may be accomplished by means of a pressure vessel such as a stirred or non-stirred pressure reactor, commercially available from Parr Instruments Co. (Moline, Ill.). The vessel should be capable of withstanding pressure and capable of sealing. The vessel containing the mixture is sealed, and the solution is heated to a temperature satisfactory to drive the hydrolysis and condensation of the reactants. Typically, the vessel is heated at a rate of about 5° C./minute until the desired temperature is reached. Suitable pressures are governed by the temperature and the vessel used to heat the reaction mixture. Generally, the desired temperature is greater than 120° C. and less than 300° C. Desirably, the temperature is between about 150° C. and about 200° C. Heating the solution within the closed vessel creates pressure. The pressure within the vessel is typically between 18 atmospheres to 40 atmospheres. Typically, the solution is heated for up to 5 hours to ensure complete hydrolysis although shorter reaction times can be effective. The length of the heating time is determined by the time necessary to achieve the desired temperature of the bulk. Once this temperature is achieved, the reaction is typically over virtually instantaneously. Additional time at this temperature typically leads to increasing crystallite sizes, which usually trends with decreased colloidal stability of the nanoparticles. Desirably, the ensemble average rutile-like crystallite size of Ti/Sb mixed oxide nanoparticles is less than about 20 nm, more desirably less than about 15 nanometers.

After heating and subsequent cooling to room temperature, the mixed metal oxide particles are typically observed as a slurry of a solid precipitate (i.e., agglomerated Ti/Sb mixed oxide nanoparticles) in the aqueous vehicle. The particles may be separated from the liquid by transferring the slurry into centrifuge bottles, centrifuging the slurry, and decanting the supernate. Other methods of separating the mixed metal oxide particles from the reaction mixture are possible such as filtration, sedimentation, or flushing.

Alternatively, any unwanted components of the reaction mixture may be removed by evaporation or by selective distillation. At this point, the metal oxide particles may, optionally, be dried.

Ti/Sb mixed oxide nanoparticles can also be prepared using a stirred tube reactor (i.e., STR). Stirred tube reactors typically have a motor driven shaft that is coaxially positioned along the length of a heated tube. The shaft has multiple paddles mounted to it that provide mixing and heat transfer of the reaction mixture. Stirred tube reactors are well known in the art. One particular STR design is described in Example 15.

Figure 2:
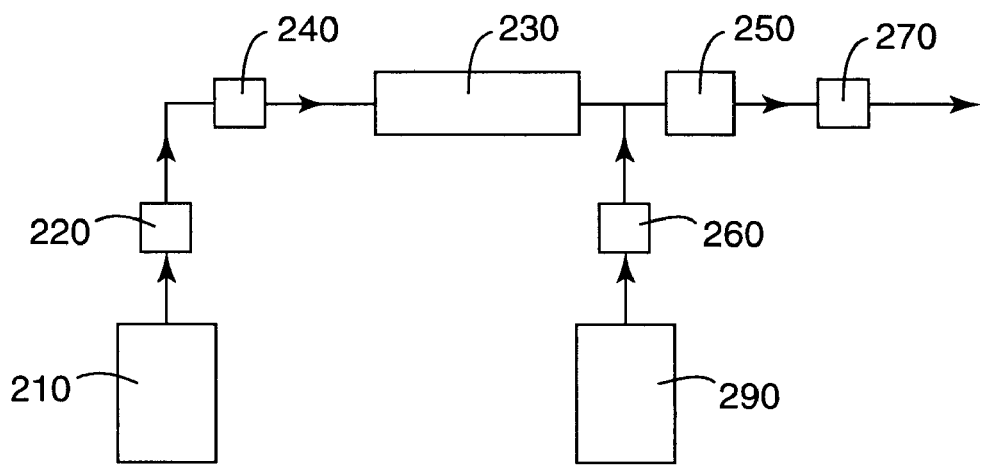
FIG. 2 is a schematic representation of a reaction system useful for preparing Ti/Sb mixed oxide nanoparticles according to the present invention.

One embodiment of a process for preparing colloidal dispersions of Ti/Sb mixed oxide nanoparticles of the invention using an STR is outlined in FIG. 2. A reservoir 210 contains an aqueous mixture of a titania precursor and an antimony oxide precursor having a solids content of 1-2 weight percent. Pump 220 feeds the aqueous mixture into STR 230 that is heated to around 180° C. to 220° C. in order to provide the heat necessary to set off the hydrothermal reaction that forms the nanoparticles. Desirably, pump 220 is capable of maintaining a substantially even flow rate (e.g., a diaphragm pump). Exemplary stirred tube reactors are described in U.S. Pat. No. 5,644,007 (Davidson et al.); U.S. Pat. No. 5,814,278 (Maistrovich et al.); U.S. Pat. No. 4,770,777 (Steadly); and U.S. Pat. No. 6,448,353 B1 (Nelson et al.), each of which is incorporated herein by reference.

In order to avoid pulsations due to the pump, which may lead to broadening of the particle size distribution, and to assist in applying surface functionalizing agent to the nanoparticles, a pulse dampener 240 is desirably disposed between pump 220 and STR 230. Hydraulic pulse dampeners are well known in the art. Exemplary pulse dampeners include closed-end pipes and are described in U. S. Pat. Nos. 5,816,291 and 2,504,424, each incorporated herein by reference. Desirably the pulse dampener comprises a closed-end stand pipe.

Figure 3:
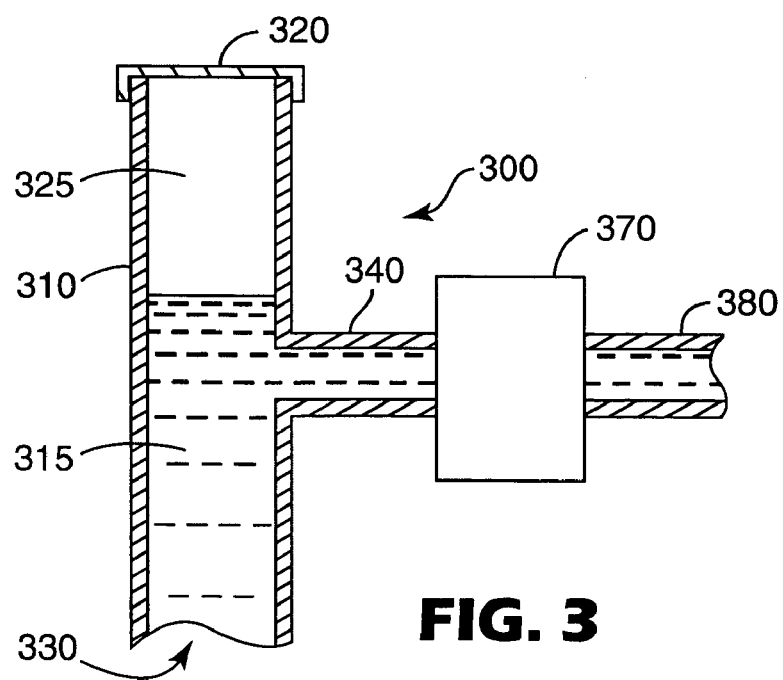
FIG. 3 is a cross-sectional view of one embodiment of a pulse dampener useful in practice of the invention.

One particularly useful embodiment of a pulse dampener is depicted in FIG. 3. Pulse dampener 300 contains a pressurized fluid 315, and consists of a length of pipe 310 having a cap 320 and an air cavity 325 at the uppermost end of the pipe, and a pressurized fluid inlet 330 at the lowermost end of the pipe. Transfer pipe 340 is perpendicularly joined to pipe 310. Transfer pipe 340 is joined to back pressure valve 370, which has an outlet pipe 380. Pipes 310, 340 and 380 are connected such that fluid travels from the inlet pipe to the outlet pipe without loss of material. When used in practice of this embodiment of the invention, pressurized fluid emerges from outlet pipe 380 and enters the STR. Thus, a diaphragm pump may on its forward stroke push a liquid into pressurized fluid inlet 330 causing air cavity 325 to shrink in volume as the air compresses. On the return stroke as the diaphragm pump refills for the next delivery, the compressed air acts as a mini-compression feed chamber and returns liquid to the fluid stream. The cycle repeats over and over as the pump operates, thereby smoothing pressure pulses of the fluid being pumped.

Typical residence times of the aqueous mixture in STR 230 are 10-20 minutes. After leaving STR 230, the heated mixture passes through a heat exchanger 250 to cool the mixture down before collection. Optionally, a second pump 260 may add a surface functionalizing agent in reservoir 290 to the heated mixture just prior to entering the heat exchanger in order to treat the surface of the particles to prevent agglomeration. A back-pressure regulator valve 270 is positioned after the heat exchanger and controls the pressure of STR 230 to make sure that the water stays in a liquid state. Typical pressures in the STR are around 250 to 350 pounds per square inch (1.7 to 2.4 megapascals). The STR provides internal mixing, which facilitates efficient heat transfer. In addition, the mixing action of the STR provides plug flow conditions inside the reactor.

After hydrothermal processing, the colloidal dispersion of Ti/Sb mixed oxide nanoparticles may contain outlier (i.e., excessively large) particles. As a result, the aqueous colloidal dispersion coming out of the STR may not be optically transparent. These outlier particles may be removed by centrifugation thereby improving the clarity of the colloidal dispersion and narrowing the particle size distribution.

The colloidal dispersion may be used in that form or solvent (e.g., water) may be replaced with an organic solvent or a solution containing an organic solvent and a dispersing aid to form a slurry using methods well known in the art. Solvents used in the present invention may be chosen based on volatility and compatibility with any binder precursor that may be used in combination with the nanoparticles. Typical organic solvents include $C_6$-$C_{12}$ aliphatic compounds, aromatic compounds, alcohols, ethers, esters, and/or ketones. Exemplary aliphatic solvents include cyclohexane, heptane, toluene, xylene, 2-butanone, or 4-methyl-2-pentanone, 1-methoxy-2-propanol, and the like. 1-Methoxy-2-propanol is especially desirable.

Ti/Sb mixed oxide nanoparticles of the present invention may be advantageously combined with at least one dispersing aid that attaches an organic moiety, desirably through at least one covalent bond, to the surface of the metal oxide particles. Typical dispersing aids include alkoxysilanes such as alkyltrialkoxysilanes, organic acids such as carboxylic acids, alcohols, polyethylene glycols, mono- or di-esters of fatty acids, polyethylene oxide and polypropylene oxide, alkoxylated phosphonic acids and their esters, and combinations thereof.

Desirably, dispersing aids include alkoxysilanes, desirably octyltriethoxysilane, octadecyltrimethoxysilane, hexadecyltrimethoxysilane, carboxylic acids, and combinations thereof.

Other suitable dispersing agents include stearic acid, oleic acid, and KEN-REACT Coupling Agent KR TTS, commercially available from Kenrich Petrochemicals (Bayonne, N.J.). Dispersing aids that are coupling agents may be used. A coupling agent is a dispersing aid with two functional groups. Suitable coupling agents include methacrylic acid, glycine, glycolic acid, mercaptoacetic acid, methacryloyloxyethyl acetoacetate, allyl acetoacetate, 3-acryloxypropyltrimethoxysilane, 3-aminopropyltriethoxysilane, 3-mercaptopropyltrimethoxysilane, 3-glycidoxypropyltrimethoxysilane, 7-octen-1-yltrimethoxysilane, and allyl triethoxysilane.

After the addition of the dispersing aid, the colloidal dispersion typically has a solids content in the range of from about 1 to about 2 weight percent, although higher and lower solids contents may also be employed. The colloidal dispersion is then stirred, preferably with heating at temperatures greater than 60° C. and less than about 95° C., until the surface of the colloidally-dispersed particles is substantially coated and/or reacted with the dispersing aid. The colloidal dispersion may be concentrated to give a colloidal dispersion having a solids content in the range of from about 2 to about 20 weight percent, desirably from about 5 to about 10 weight percent. The colloidal dispersion typically has a ratio of dispersing agent to metal oxide of about 0.1 to 6.0 millimole/gram, desirably 0.2 to 2.0 millimole/gram.

An amount of water (neutral, acidic, or alkaline) may then be added in sufficient amount to remove any remaining hydrolyzable groups and further condense dispersing agents to the particle surface. For the purpose of the present invention, base hydrolysis was found to be particularly advantageous for hydrolysis of the alkoxyorganosilane and condensation onto the particle surface.

An optional step involves the removal of high boiling point by-products from the stable colloidal dispersion, whereby the stable colloidal dispersion is concentrated to a syrup by heat or vacuum drying. If the stable colloidal dispersion comprises a polar liquid, the crystalline nanoparticles are weakly flocculated by the addition of a non-polar liquid. If the stable colloidal dispersion comprises a non-polar liquid, the crystalline nanoparticles are weakly flocculated by the addition of a polar liquid. The flocculated nanoparticles are typically isolated by centrifugation and then washed by re-suspension in one of the flocculating liquids and separated by centrifugation. The precipitate may be dried to form a powder, or the precipitate may be dispersed in an organic liquid or solvent to form a colloid.

Colloids of the present invention are stable dispersions as measured by centrifuging the colloid samples at 2500 rpm for 10 minutes. Colloids (or sols), if substantially free of sediment after centrifugation, are said to be stable dispersions.

The invention will now be described further by way of the following examples.

EXAMPLES

Materials employed in the examples that follow may be obtained from general commercial chemical vendors such as Aldrich Chemical Co. (Milwaukee, Wis.) unless otherwise indicated.

Test Methods Used in the Examples

Particle Size

Particle Size was determined by Photon Correlation Spectroscopic analysis using a Coulter N4 Submicron Particle Analyzer, commercially available from Coulter Corp. (Miami, Fla.).

Crystalline Phase

X-ray diffraction analysis (i.e., XRD) was used to determine the crystalline phase. Data were collected using a Philips vertical diffractometer, commercially available from Philips Electronic Instruments Co. (Mahwah, N.J.). The diffractometer was fitted with variable entrance slits, fixed 0.2 degree receiving slit, graphite diffracted beam monochromator, and proportional detector for registry of the scattered radiation. A sealed copper target X-ray source was used at generator settings of 45 kV and 35 mA. Each sample was prepared as an ethanol slurry on a glass substrate. Survey step scans were conducted from 5 to 80 degrees (2θ) using a 0.04 degree step interval and 4 second counting time. Identification of the crystalline phases present was achieved by comparison (as described by H. P. Klug and L. E. Alexander in "X-Ray Diffraction Procedures for Polycrystalline and Amorphous Materials", John Wiley & Sons, New York (1954)) of the observed diffraction maxima to the patterns present in the International Centre for Diffraction Data powder data file (International Centre for Diffraction Data, 12 Campus Boulevard, Newton Square, Pa.).

INTERMEDIATES USED IN THE EXAMPLES

Peroxy Titanic Acid

A 2-liter flask was charged with 848 g deionized water, 85 g of 30 weight percent hydrogen peroxide, commercially available from Fisher Scientific (Pittsburgh, Pa.) and 32 g of 0.33 M aqueous ammonium hydroxide. The stirred contents of the flask were cooled to 10° C. in a cold-water bath, and 35.6 g titanium tetraisopropoxide, commercially available from Gelest, Inc. (Tullytown, Pa.) was added slowly over 3 minutes resulting in an orange-yellow precipitate and the gentle evolution of gas. The slurry was allowed to slowly warm to room temperature over 6 hours over which time the precipitate was fully digested to give a yellow, pourable liquid composed of peroxy titanic acid in water (theoretical yield was 1 weight percent $TiO_2$).

Antimony Hydrogen Peroxide Solution

A 1-liter flask was charged with 469 g deionized water and 21 g of 30 weight percent hydrogen peroxide. The stirred contents were cooled to 5° C. in an ice bath, and 10.5 g antimony tri-n-butoxide was added slowly over 3 minutes resulting in a white precipitate. The slurry was allowed to slowly warm to room temperature over 6 hours during which time the precipitate was fully digested to give a clear colorless solution (theoretical yield was 1 weight percent $Sb_2O_5$).

Preparation of Colloidal $HSb(OH)_6$

A 0.5-liter flask was charged with 297 g deionized water, 20 g AMBERLITE IR-120 (plus) ion-exchange resin, and 4.9 g potassium hexahydroxyantimonate. The resultant slurry was allowed to mix 14 hours and subsequently heated to 65° C. for 1 hour to form a stable white sol. The sol was cooled to room temperature and filtered on a C-grade glass frit to give an aqueous white colloid of $HSb(OH)_6$ with a measured pH of 3 (theoretical yield was 1 weight percent $Sb_2O_5$).

Examples 1-13 and Comparative Examples A-C

Examples 1-13 and Comparative Examples A-C were generated according to the following general procedure, with modifications to amounts of ingredients as indicated in Table 1, describes the preparation of an aqueous colloid containing Ti/Sb mixed oxide nanoparticles having a rutile-like crystalline phase.

A 2-liter pressure reactor, commercially available from Pressure Products Industries, Inc. (Warminster, Pa.) was charged with about 1200 g of a mixture of peroxy titanic acid and colloidal $HSb(OH)_6$ in a weight ratio as indicated in Table 1. The reactor was heated to 180° C. for 3 hours. The reactor was allowed to cool slowly to room temperature over 12 hours. The resultant transparent colloid was filtered through a GF/B filter (glass fiber filter, 1.0 micrometer pore size), commercially available from Whatman, Inc. (Clifton, N.J.).

The results show that nanoparticles having rutile-like phases were obtained for compositions of Ti/Sb mixed oxides having a theoretical $Sb_2O_5$ content greater than 10 weight percent, but less than 100 weight percent.

TABLE 1

| Example | Weight Percent $Sb_2O_5$ | Weight Ratio of Sb/Ti | Powder X-ray Diffraction Relative Intensities | | | Powder X-ray Diffraction Crystallite Sizes (nm) | | | Lattice Parameters | | | | Dynamic Light Scattering[a] Solution Particle size (nm) |
|---|---|---|---|---|---|---|---|---|---|---|---|---|---|
| | | | Anatase | Rutile | $Sb_2O_5 \cdot 4H_2O$ | Anatase | Rutile | $Sb_2O_5 \cdot 4H_2O$ | Anatase a | c | Rutile a | c | |
| Comparative Example A | 0 | 0.00 | 100 | 2 | 0 | 19.5* | 0.0 | 0.0 | 3.796 | 9.528 | — | — | 1000 |
| Comparative Example B | 5 | 0.07 | 100 | 1 | 0 | 24.5 | 0.0 | 0.0 | 3.802 | 9.541 | — | — | 278 |
| 1 | 10 | 0.14 | 100 | 14 | 0 | 19.0 | 14.0 | 0.0 | 3.800 | 9.522 | 4.610 | 2.974 | 233 |
| 2 | 15 | 0.22 | 19 | 100 | 0 | 13.0 | 13.5 | 0.0 | 3.797 | 9.562 | 4.623 | 2.987 | 173 |
| 3 | 20 | 0.31 | 3 | 100 | 0 | <5 | 12* | 0.0 | — | — | 4.628 | 2.990 | 42* |
| 4 | 25 | 0.42 | 0 | 100 | 0 | 0.0 | 10.5 | 0.0 | — | — | 4.633 | 2.997 | 51* |
| 5 | 30 | 0.54 | 0 | 100 | 0 | 0.0 | 10.0 | 0.0 | — | — | 4.639 | 2.998 | 6 |
| 6 | 35 | 0.68 | 0 | 100 | 0 | 0.0 | 9.0 | 0.0 | — | — | 4.638 | 3.010 | 32 |
| 7 | 40 | 0.84 | 0 | 100 | 0 | 0.0 | 9.8* | 0.0 | — | — | 4.649 | 2.997 | 30 |
| 8 | 45 | 1.03 | 0 | 100 | 0 | 0.0 | 10.0 | 0.0 | — | — | 4.657 | 3.012 | 3 |
| 9 | 50 | 1.26 | 0 | 100 | 0 | 0.0 | 10.3* | 0.0 | — | — | 4.657 | 3.001 | 28 |
| 10 | 60 | 1.88 | 0 | 100 | 0 | 0.0 | 11.5 | 0.0 | — | — | 4.659 | 3.017 | 47 |
| 11 | 70 | 2.93 | 0 | 100 | 0 | 0.0 | 12.5 | 0.0 | — | — | 4.664 | 3.006 | 166 |
| 12 | 80 | 5.02 | 0 | 71 | 100 | 0.0 | 11.5 | 20.0 | — | — | 4.666 | 3.025 | 6 |
| 13 | 90 | 11.30 | 0 | 12 | 100 | 0.0 | 12.0 | 17.5 | — | — | 4.658 | 3.018 | 105 |
| Comparative Example C | 100 | N/a | 0 | 0 | 100 | 0.0 | 0.0 | 18.5 | — | — | — | — | 30 |

In Table 1,
*indicates the value is the numerical average of two separate measurements.

Example 14

This example describes the preparation of an aqueous colloid of Ti/Sb mixed oxide nanoparticles having a rutile-like crystalline phase.

A 2-liter pressure reactor was charged with 1369 g of peroxy titanic acid and 342 g colloidal $HSb(OH)_6$ (weight ratio was 80 parts titanium dioxide to 20 parts antimony oxide). The reactor was heated to 180° C. for 2 hours. The pressure in the reactor reached 300 pounds per square inch (2.07 megaPascals). The reactor was cooled quickly to 75° C. by packing the outside of the reactor with dry ice. The reaction produced a transparent colloid with a slight blue hue and a measured particle size of 31.9 nanometers with a standard deviation of 6.4 nanometers. A portion (i.e., 5 mL) of the colloid was dried in a 100° C. oven and the resultant powder was analyzed by XRD which showed a rutile-like peak with 100 percent relative intensity having a 20.5 nanometers crystallite size and a 49 percent relative intensity anatase peak having a 15.0 nanometers crystallite size. There was no evidence of a separate antimony oxide phase, instead the observed diffraction maxima for the rutile-like phase were slightly shifted from rutile itself, indicating the antimony atoms were distributed throughout the lattice structure.

Example 15

This example shows the use of a stirred tubular reactor to prepare Ti/Sb according to one embodiment of the invention.

Colloidal $HSb(OH)_6$ was added to peroxy titanic acid such that a calculated weight ratio of $TiO_2$ to $Sb_2O_5$ was 80/20 obtained. Sufficient concentrated ammonium hydroxide was added to the mixture in order to raise the pH to about 7, which made the precursor stable and prevented gelation. The mixture formed an intermediate peroxy complex that was allowed to digest over 3 hours to form a clear orange solution of mixed metal peroxy complex (1 percent $TiO_2/Sb_2O_5$ by weight).

The mixture was injected in to a 316 stainless steel 2-liter stirred tube reactor operated at a heater temperature of 204° C. and a residence time of 11.1 minutes. The length of the STR was 60 inches and the inside diameter was 2 inches to give an L/D ratio of 30. The throughput was 180 grams per minute, and the stirring motor speed was 120 revolutions per minute. The system pressure was 300 pounds per square inch (2.1 megaPascals). The temperature at the output of the reactor was 190° C.

The mixture was pumped through the reactor using a diaphragm pump (Model No. EK-1) commercially available from American Lewa, Inc. (Holliston, Mass.) having a pulse dampener consisting of an air cavity made from an end-capped length of 10 inch ½" OD stainless steel pipe, and a back pressure valve arranged as depicted in FIG. 3 contiguously situated between the pump and the inlet to the STR. The output mixture from the STR was immediately passed through a heat exchanger to rapidly cool the mixture to about 75-80° C. The particle size of the resultant colloidal dispersion was determined using a CHDF 2000 particle analyzer obtained from Matec Applied Sciences, Inc. (Northborough, Mass.). The weight average particle size was 123 nanometers.

This dispersion was centrifuged using a CARR POWER-FUGE PILOT gravity centrifuge available from Kendro Laboratory Products (Franklin, Mass.) using a speed setting of 10 (corresponding to a G-Force of 20,308) resulting in a transparent colloidal dispersion of Ti/Sb mixed oxide nanoparticles, exhibiting a rutile-like crystalline phase, having a weight average particle size of 64 nanometers and a narrow size distribution.

Example 16

This example shows the preparation of a composite article employing colloidal surface modified Ti/Sb mixed oxide nanoparticles having a rutile-like crystalline phase.

An 8-ounce (237 milliliters) glass jar was charged with 100 grams of antimony doped titanium oxide colloid (as prepared in Example 3) and 600 milligrams SILQUEST A1230 (a silane coupling agent commercially available from Witco Corp. of Endicott, N.Y.). The transparent colloid was placed in an 80° C. oven for 16 hours, then cooled to room temperature. The colloid was transferred to a flask and reduced down to 3 grams utilizing a rotary evaporator. 1-Methoxy-2-propanol (18 grams, commercially available from Aldrich of Milwaukee, Wis.) was added to the colloid and the mixture was reduced to 7 grams utilizing a rotary evaporator. 1-Methoxy-2-propanol (12 grams) was added to the colloid and the mixture was reduced utilizing a rotary evaporator to give final colloid with 8.1 weight percent metal oxide.

This colloid was mixed with 1.85 grams of a mixture of 30 weight percent SR 295 (trade designation for pentaerythritol tetraacrylate), 30 weight percent SR 506 (trade designation for isobornyl acrylate), and 40 weight percent SR 238 (trade designation for 1,6-hexanediol diacrylate) all commercially available from Sartomer Company, Inc. (Exton, Pa.). Tris(N-nitroso-N-phenylhydroxyl-aminato)aluminum (2 milligrams) available from First Chemical Corp. (Pascagoula, Miss.) was added to the mixture, which was then reduced utilizing a rotary evaporator to 3.83 grams. Thermogravimetric analysis of the resin indicated 22.65% inorganic solids in the resin.

2,4,6-Trimethylbenzoyl-diphenyl-phosphine oxide liquid photoinitiator commercially available from BASF Corp. (Mount Olive, N.J.) under the trade designation LUCIRIN LR 8893, was added at 1 percent to the resin that was then bar coated at 0.5 mils thickness onto a 0.125 inch polymethyl methacrylate sheeting.

The coated sample was cured by passing the coated sample through a Fusion UV Systems UV processor (VPS-6 power supply, EPIQ 6000 irradiator obtained from Fusion UV Systems, Corp. (Rockville, Md.) that was equipped with a "D"-bulb on full power (600 W/in) and operating at a line speed of 40 feet per minute (12.2 meters per minute).

The resultant cured coated film had a measured refractive index of 1.569.

Various modifications and alterations of this invention will become apparent to those skilled in the art without departing from the scope and spirit of this invention. It therefore should be understood that this invention is not to be unduly limited to the illustrative embodiments set forth above, but is to be controlled by the limitations set forth in the claims and equivalents thereof.

What is claimed is:

1. A composition comprising irreversibly agglomerated nanoparticles, wherein the agglomerated nanoparticles comprise Ti/Sb mixed oxide nanoparticles comprising a rutile-like crystalline phase having a tetragonal crystal structure and a space group of $P4_2/mnm$(#136), wherein the Ti/Sb mixed oxide nanoparticles have an ensemble average rutile-like crystalline phase content of at least 20 weight percent, wherein the nanoparticles have at least one organic moiety bound to the nanoparticle surface, and wherein the weight ratio of antimony to titanium in the Ti/Sb mixed oxide nanoparticles is in a range of from at least 0.42 up to and including 2.93.

2. The composition of claim 1, wherein the ensemble average nanoparticle size is less than about 100 nanometers.

3. The composition of claim 1, wherein the ensemble average nanoparticle size is less than about 40 nanometers.

4. The composition of claim 1, wherein the ensemble average rutile-like crystalline phase content of the Ti/Sb mixed oxide nanoparticles is at least about 40 weight percent.

5. The composition of claim 1, wherein the ensemble average rutile-like crystalline phase content of Ti/Sb mixed oxide nanoparticles is at least about 60 weight percent.

6. The composition of claim 1, wherein the ensemble average rutile-like crystalline phase content of Ti/Sb mixed oxide nanoparticles is at least about 80 weight percent.

7. The composition of claim 1, wherein substantially all of the Ti/Sb mixed oxide nanoparticles contain a rutile-like crystalline phase.

8. The composition of claim 1, wherein the agglomerated nanoparticles are redispersible into a liquid vehicle.

* * * * *

UNITED STATES PATENT AND TRADEMARK OFFICE
CERTIFICATE OF CORRECTION

PATENT NO.        : 7,250,118 B2
APPLICATION NO.   : 10/915308
DATED             : July 31, 2007
INVENTOR(S)       : John T. Brady It is certified that error appears in the above-identified patent and that said Letters Patent is hereby corrected as shown below:

Title Page
Item [75], Inventors, delete "; Robert W. Ferguson, St. Paul, MN (US); James A. Higgins, River Falls, WI (US); Charles J. Studiner, IV, Cottage Grove, MN (US)" following David S. Arney, St. Paul, MN (US)

Signed and Sealed this

Fourteenth Day of July, 2009

JOHN DOLL
*Acting Director of the United States Patent and Trademark Office*